(12) United States Patent
Grammss et al.

(10) Patent No.: US 6,666,516 B2
(45) Date of Patent: Dec. 23, 2003

(54) NECK REST FOR A SEAT FOR AUTOMOBILES

(75) Inventors: Rainer Grammss, Iserlohn (DE); Carsten Albracht, Iserlohn (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 10/207,825

(22) Filed: Jul. 31, 2002

(65) Prior Publication Data
US 2003/0042781 A1 Mar. 6, 2003

(30) Foreign Application Priority Data
Aug. 31, 2001 (DE) .......................... 101 42 625

(51) Int. Cl.⁷ .................................. A47C 1/10
(52) U.S. Cl. ...................... 297/407; 297/408
(58) Field of Search ..................... 297/406, 407, 297/408, 409, 216.12

(56) References Cited

U.S. PATENT DOCUMENTS

| | | | | |
|---|---|---|---|---|
| 4,278,291 A | * | 7/1981 | Asai | |
| 5,904,405 A | * | 5/1999 | Wu | |
| 6,062,643 A | * | 5/2000 | Schroten et al. | |
| 6,082,817 A | * | 7/2000 | Muller | |
| 6,149,231 A | * | 11/2000 | Wustholz | |
| 6,158,812 A | * | 12/2000 | Bonke | |
| 6,213,548 B1 | * | 4/2001 | Van Wynsberghe et al. | |
| 6,513,871 B2 | * | 2/2003 | Bartels | |

FOREIGN PATENT DOCUMENTS

| | | |
|---|---|---|
| DE | 39 00 495 | 7/1990 |
| DE | 296 03 991 | 7/1996 |
| DE | 197 07 998 | 9/1998 |
| DE | 298 08 982 | 9/1998 |
| DE | 199 51 966 A1 | 5/2001 |
| DE | 199 61 617 A1 | 7/2001 |

* cited by examiner

Primary Examiner—Laurie K. Cranmer
(74) Attorney, Agent, or Firm—Lowe Hauptman Gilman & Berner LLP

(57) ABSTRACT

An automobile-seat headrest has a fixed support enclosed by a fixed pad and two rods which are connected to the support and which are received in the headrest bushes in a seat backrest, a second support for a displaceable pad being displaceably resting in the fixed support and allowing to set the displaceable pad between a retracted position at least partly received in the fixed pad and an advanced position, and vice-versa, wherein the displaceable pad is advanced relative to the fixed pad toward the head of the seated person, a drive device being provided to set the displaceable head pad into the advanced position.

20 Claims, 3 Drawing Sheets

NECK REST FOR A SEAT FOR AUTOMOBILES

TECHNICAL FIELD

The present invention relates to an automobile-seat headrest.

BACKGROUND ART

Conventional headrests consist of a padded part slidably mounted on two rods in the seat's backrest, said rods being inserted in the backrest's headrest bushes. The padded part contains a support connected to the head rest's rods.

In general the headrests are configured improperly or inadequately in a vehicle and assume a position matching the driver or passenger. In case of a rear-end collision, a large spacing between the head and the headrest entails pronounced tensile stresses in the neck that may result in substantial injuries to it. A case of improper position in particular results when the headrest is too low on the backrest.

The objective of the present invention is to create a headrest remedying the above defects.

SUMMARY OF THE INVENTION

As regards the headrest of the invention, a second support for a displaceable pad is displaceably mounted on the fixed pad, the displaceable pad being adjustable between a retracted position in the said fixed pad and an extended position, and vice versa, the displaceable pad when advanced being moved forward from the fixed pad toward the head of the seated person. The invention furthermore provides a drive device to set the displaceable pad into its extended position.

In one embodiment of the present invention, the displaceable pad when in its advanced position also is raised above the fixed pad. In this manner the displaceable pad not only is displaced relative to the head as regards the sitting position, but also it is raised with respect to the head.

In case of a rear impact on the vehicle, the displaceable pad, having moved toward the back of the driver's head, assures direct support for the driver's head and as a result the driver is virtually made safe against the so-called whiplash effect. Following the accident, the headrest may be moved back into its initial, that is the retracted position and shall be operational once more.

A number of designs are applicable to displaceably support the movable headrest at the fixed pad. Preferably a lever linkage shall be used, in particular a spring-loaded parallelogram. Once the spring has been released, for instance from a locked position, the parallelogram linkage is able to advance the displaceable pad and to move it near the back of the head of the seated person. It is understood that in case of impact on said displaceable pad, it may not yield excessively but instead shall absorb said impact. Accordingly, in one embodiment of the invention, a stop is used that shall act as a rest for one or more levers of the parallelogram when on account of impact on the displaceable pad a force shall be exerted on it in the direction of the fixed pad. However locking mechanisms also are applicable that shall lock the displaceable and extended pad to absorb a pertinent force. Such locking action then must be eliminated once the displaceable pad must be returned into its rest position.

As mentioned above, the displaceable pad may be spring-loaded into the extended position, or a locking element may be used to lock the spring or the linkage against the spring bias in the retracted position. An appropriate drive device furthermore includes an unlocking element in order to release the lock. This goal may be attained in the present invention by using a cable. This cable must be positioned at a site appropriate for its activation when rear-end impact takes place. Illustratively this feature may be implemented by the pressure exerted by the seated person's back against the backrest when the vehicle's rear is impacted.

However the force setting the displaceable pad also may be applied to a component remote from the headrest and by cable force transmission. Again a number of designs are conceivable. One design of the invention employs a drive device with a first and a second element that are mutually displaceable in to-and-fro manner and which are kept apart by a spring that biases the two elements apart. One of said elements guides a carriage linked to a lever of which the other end is linked to the other element. A cable is affixed to the carriage. The carriage shall be displaced when the two elements are mutually moved to-and-fro. The carriage is adjusted in this manner and an adjusting force can be exerted on the cable which in turn sets the displaceable pad into the extended position. The support may be connected to the displaceable pad in the manner already described above.

Preferably the displaceable pad is received in part or in whole in the fixed pad. Accordingly, in one embodiment of the present invention, the fixed support shall exhibit a U-shape and the displaceable support shall be preferably planar, their dimensions being selected in a manner that the displaceable pad when in its rest position shall be received in a matching clearance in the fixed pad.

BRIEF DESCRIPTION OF THE DRAWINGS

Illustrative embodiments of the present invention are elucidated below in relation to the attached drawings.

DETAILED DESCRIPTION OF THE INVENTION

Figure 1:
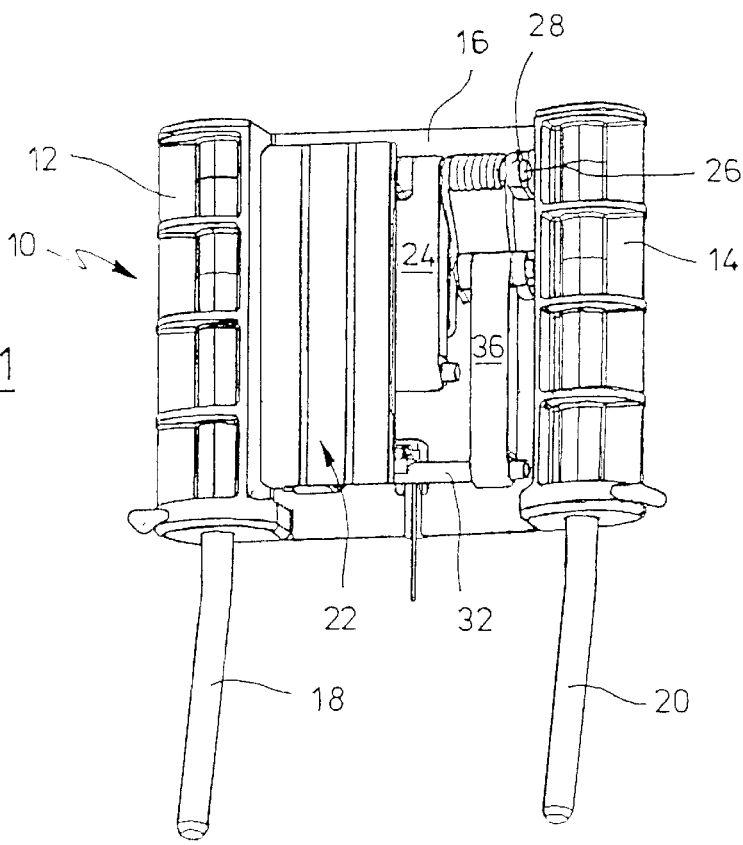
FIG. 1 is a front view of the supports of a headrest of the invention.
Figure 2:
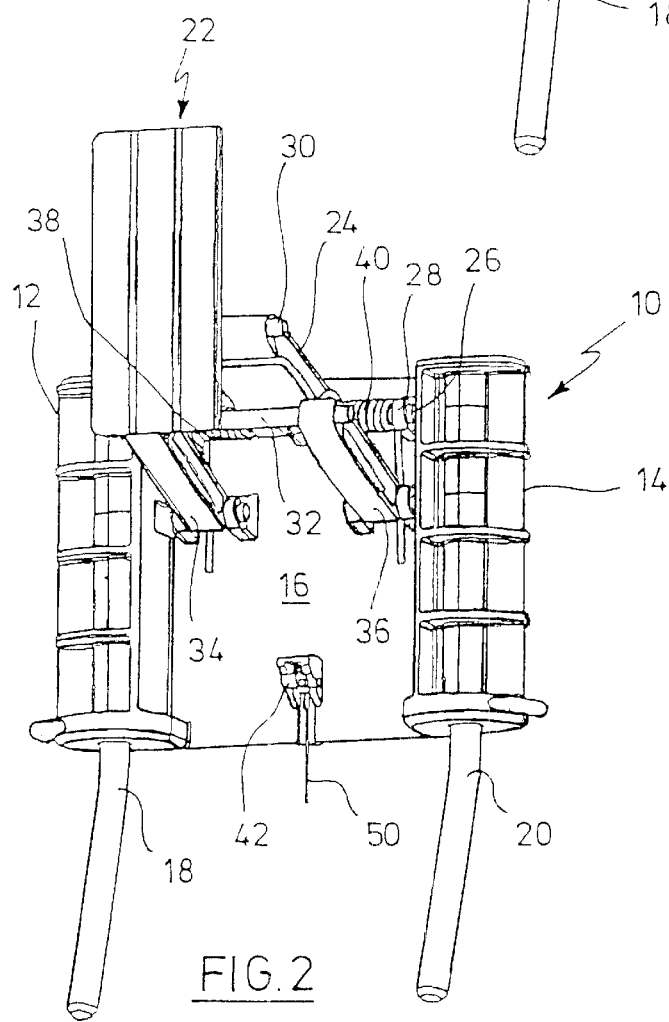
FIG. 2 is a view similar to that of FIG. 1 when the displaceable support of the headrest of the invention has been advanced.

FIGS. 1 and 2 show a fixed headrest support consisting of two mutually spaced columnar segments 12, 14 and a plate 16 connecting them. The components 12 through 16 are integrally made of a suitable and strong plastic. Headrest rods 18, 20 are firmly affixed in the columnar segments 12, 14 and will be inserted into headrest bushes of an omitted backrest of an automobile seat. Padding omitted from this Figure but conventional and known as regards such headrest is mounted at the back of the described support 10, at the top side and laterally from the columnar segments 12 and 14.

A displaceable planar support 22 for a displaceable headrest component is situated between the columnar segments 12, 14. Said support 22 also is made of a suitable, strong plastic. It may be moved to-and-fro between a retracted position shown in FIG. 1 wherein it is situated between the columnar segments 12, 14 and an advanced position shown in FIG. 2 wherein it projects from the fixed support 10 and furthermore is raised. For that purpose the displaceable support 22 is connected to a parallelogram bar linkage. The parallelogram bar linkage comprises a first an upper, relatively wide, lever 24 connected by a shaft 26 to the front side of the plate 16. The shaft 26 is held in brackets, of which one (28) is shown, against the front side of the plate 16. Brackets also are mounted on the back side of the planar support 22 which is shown only partly—actually it occupies the space between the columnar segments 12, 14—and said brackets bear a shaft 30 in order to link the lever 24 to the back side of the displaceable planar support 22.

Another shaft 32 is rotatably supported in corresponding but omitted brackets at the back side of the planar support 22 and is linked to two mutually parallel levers 34, 36. The levers 34, 36 are linked in corresponding brackets at the front side of the plate 16, however these particulars will not be discussed in detail. Springs 38, 40 are mounted on the shaft 26 on opposite sides of the lever 24 and bias the above described parallelogram linkage into a position shown in FIG. 2.

The displaceable support 22 in turn is enclosed by omitted padding. Said support shall provide an advantageous rest for the rear of the head of the person sitting in the omitted seat when, due to a collision, the head shall be forced rearward. The levers 24, 34 and 36 slope upward and a spring or an omitted stop assures that the position shown in FIG. 2 shall not be vacated by pressure applied to the displaceable support 22 and further upward pivoting.

If the displaceable support 22 must assume the position shown in FIG. 1, it must be pivoted downward, optionally manually. In this process the rod 32 pivots behind a hook 42 shown in further detail in FIG. 3. A bracket 44 is integrated into the front side of the plate 16 and supports the hook 42 in pivotable manner, namely at 46 about an approximately horizontal axis. Moreover said hook is loaded downward by a spring 48. By pivoting the rod 32 toward the rounded, oblique front side of the hook 42, this hook shall be temporarily deflected upward and shall then snap over the rod 32 whereby the support 22 is kept in the position shown in FIG. 1. Using a cable denoted by the reference 50, the hook 42 may be pivoted upward. In this manner the springs 38, 40 allow pivoting the linkage and moving the support 22 into the position shown in FIG. 2.

Figure 3:
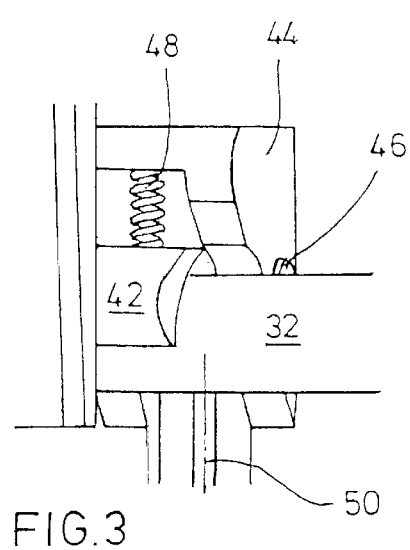
FIG. 3 shows a detail of the headrest of FIGS. 1 and 2.
Figure 4:
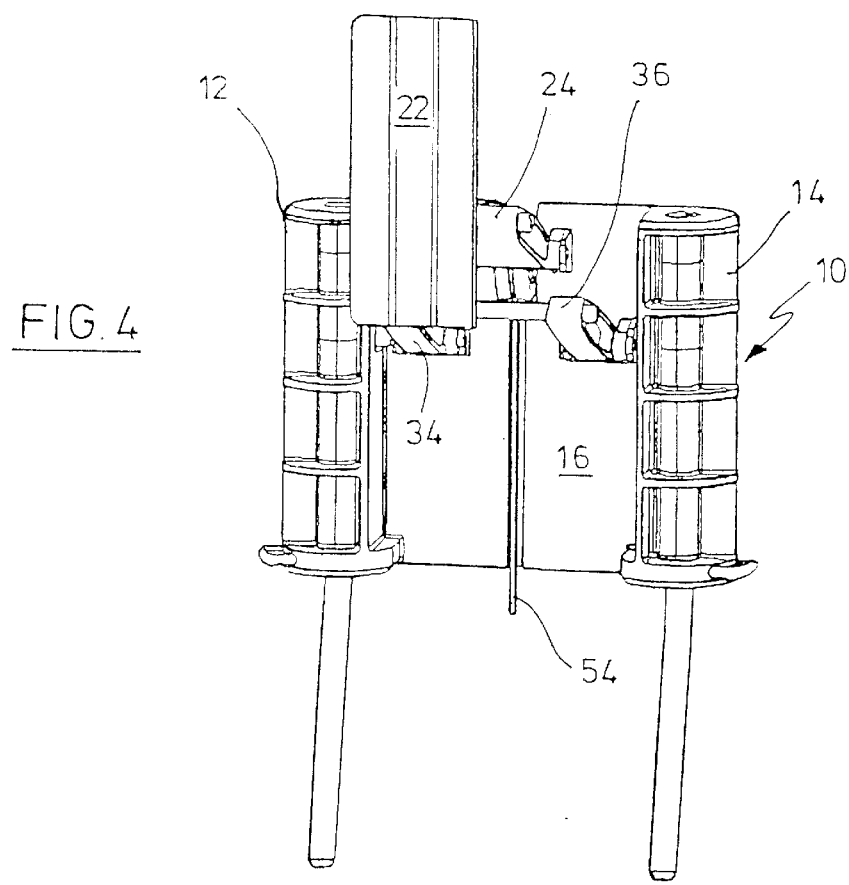
FIG. 4 shows the supports of an embodiment variation of the headrest of the invention.
Figure 5:
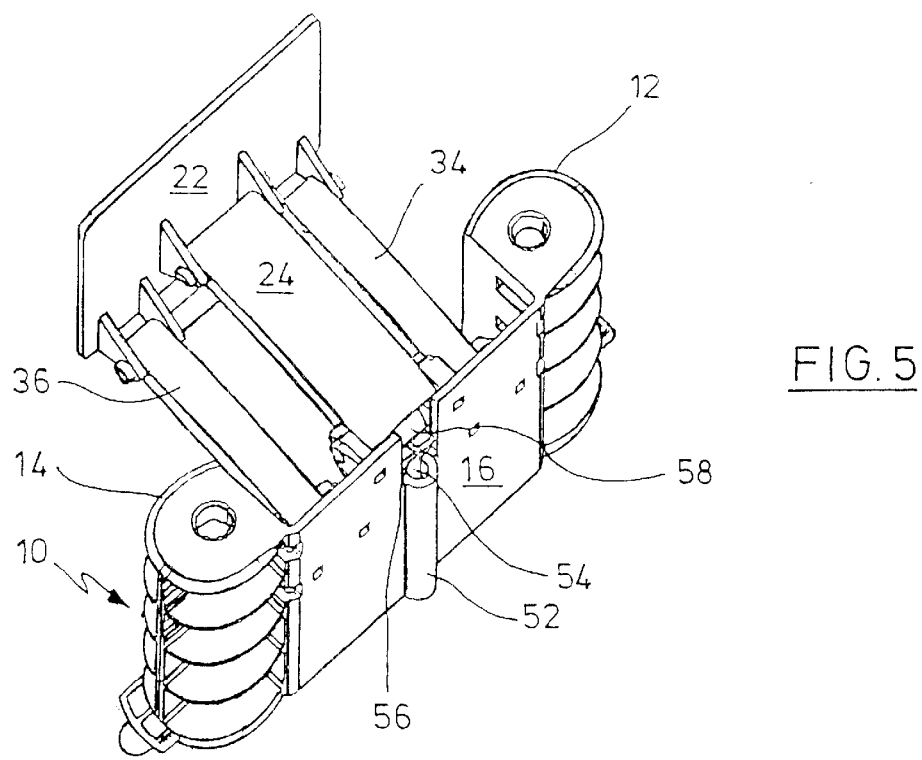
FIG. 5 is a perspective of the rear of the supports of FIG. 4.

The operation of the cable 50 is omitted. It operates in the manner of a converter converting a collision at the vehicle rear (omitted) into a traction on the cable 50.

Where elements identical or similar to those of FIGS. 1 through 3 also are used in FIGS. 4 and 5, the same reference numerals will be carried over.

FIG. 5 shows especially clearly the linkages of the levers 34, 24 and 36 to the back side of the displaceable support 22 which furthermore is also shown in full in this FIG. 5, rather than as in FIG. 4 where only half of it is displayed.

A guide 52 is situated in the in the longitudinal center of the pate 16 assuming the geometry of a half-bush which passes a cable 54 (also see FIG. 4). The cable is hooked by means of a toggle at 56 to a lever arm 58 projecting rearward beyond the pivot axis. Therefore, by pulling on the cable 54, the planar support 22 may be pivoted from a position between the columnar segments 12, 14 into a position in front of them as shown in FIGS. 4 and 5. In this instance therefore the actuation of the displaceable support 22 is not initiated by a spring directly at the headrest, but remotely from the headrest by means of a drive device illustratively described in FIGS. 6 through 9.

The drive device of FIGS. 6 through 9 is denoted by the reference 60. It comprises a first boxy part 62 telescopically nesting a second boxy part 64. Four cross-sectionally circular guide pins 66 are configured at the ceiling wall of the boxy part 62 at its inward corners and said pins are received in circular guides 68 and furthermore are enclosed by helical springs 70.

Figure 6:
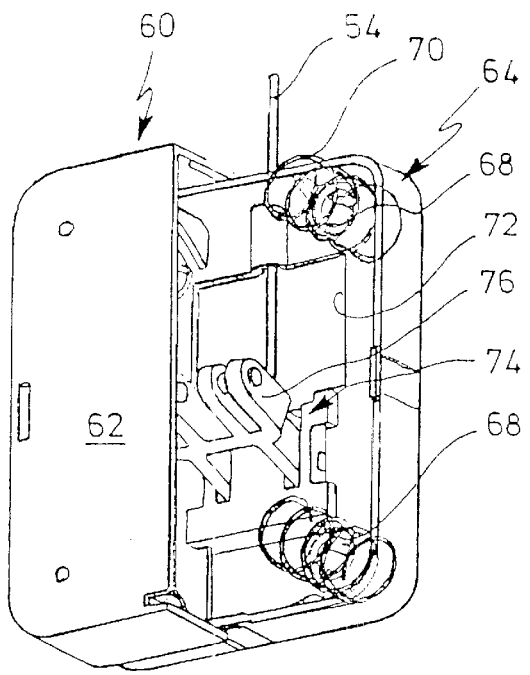
FIG. 6 is a partly cutaway perspective of a drive device for the headrest of FIGS. 4 and 5.
Figure 7:
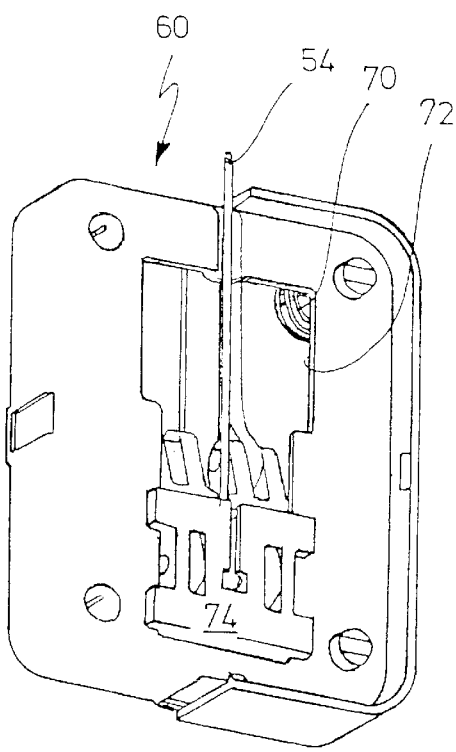
FIG. 7 is a perspective of the rear of a portion of the drive device of FIG. 6.
Figure 8:
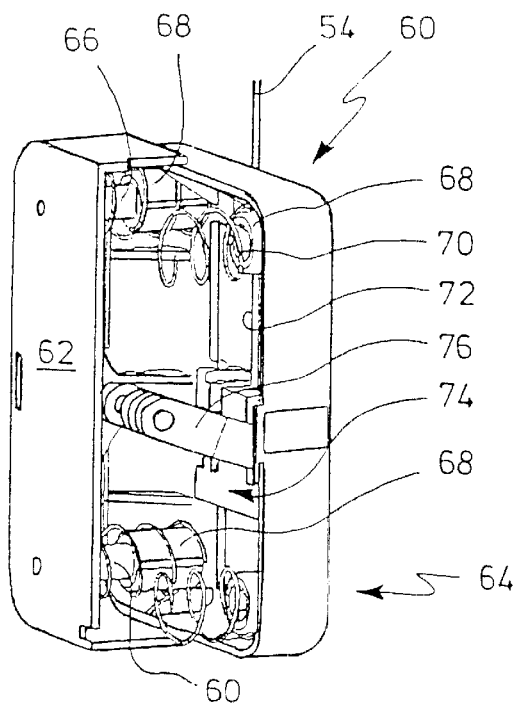
FIG. 8 is a perspective elevation of the drive device of FIG. 6, in the deactivated state.
Figure 9:
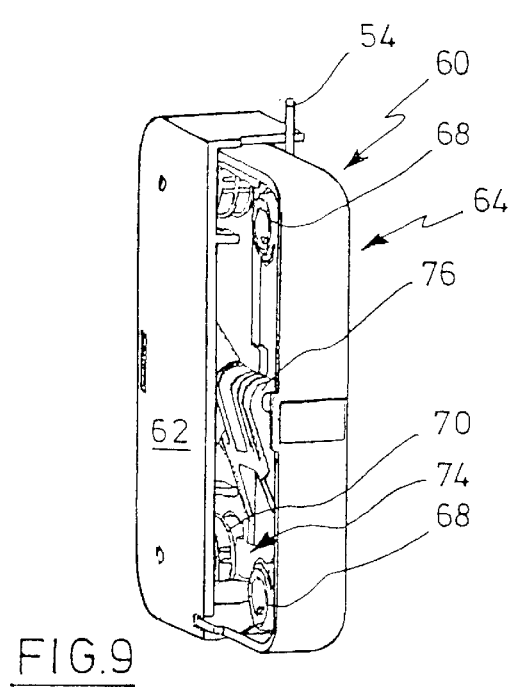
FIG. 9 is a view similar to that of FIG. 8, however in the activated state.

A carriage 74 is mounted in a clearance 72 of the ceiling wall of the boxy part 64. The carriage 74 slides within the narrower portion of the clearance 72 and is fitted with (unreferenced) channels cooperating with the edges of the clearance 72. As a result the carriage may be moved to-and-from between a position shown in FIG. 6 and a position shown in FIG. 7. The cable 54 is affixed to said carriage. Furthermore a connecting lever 76 is linked to the carriage 74 which, as shown especially clearly in FIG. 8, is linked by its other end to the inside of the ceiling segment of the boxy part 62. When the springs 70 of FIG. 8 and also of FIG. 6 are unstressed, the connecting lever 76 is supported somewhat obliquely and the carriage 74 shall be in its first position. If next the boxy parts 62, 64 are compressed, they shall approach each other while compressing the spring 70. In this process the connecting lever 76 will pivot and it shall set the position of the carriage 74 into the other end position shown in FIG. 7. In this manner a traction is exerted on the cable 54 and the displaceable support 22 shall be advanced into the position shown in FIGS. 4 and 5. If the compression between the parts 62, 64 decreases, the cable 54 shall be relaxed and the displaceable support 22 shall be able to pivot back into its initial position.

Illustratively the drive device 60 of FIGS. 6 through 9 may be activated, by being integrated into the backrest and by repeated pressures being applied from the back of the seated person. In this manner, in the event of a collision at the rear of the vehicle, advance of the displaceable support 22 shall be automatic.

What is claimed is:

1. A headrest for an automobile seat, said headrest comprising:
   a first, fixed support enclosed by a fixed pad;
   two rods connected to said support and adapted to be received in headrest bushes configured in a backrest of the automobile seat;
   a second, displaceable support supporting a displaceable pad, wherein said second support rests in displaceable manner on said first, fixed support and allows setting the displaceable pad between a retracted position, where the displaceable pad is situated at least partly within said first, fixed support, and an advanced position, where the displaceable pad is moved relative to the fixed pad forward, towards the head of a person seated in the automobile seat; and
   a drive device being provided to set the displaceable pad into the advanced position;
   wherein
   the second, displaceable support is linked by a lever linkage to the first, fixed support; and
   the drive device comprises a spring acting on the second, displaceable support, a locking element locking the spring or the linkage against the spring bias for the retracted position of the displaceable pad, and an unlocking element for releasing the locking element.

2. The headrest as claimed in claim 1, wherein said locking element includes a spring-loaded locking hook that keeps the linkage in a position corresponding to the retracted position of the displaceable pad, and that is actuated by a cable.

3. A headrest for an automobile seat, said headrest comprising:

a first support;

at least one rod connected to said first support and adapted to support said first support from a backrest of the automobile seat;

a second support displaceable relative to said first support between a retracted position, where the second support is situated at least partly within said first support, and an advanced position, where the second support is moved relative to the first support forward, towards the head of a person seated in the automobile seat; and a drive device for setting the second support into the advanced position, wherein the drive device comprises a first structural part and a second structural part moveable relative to each other, at least one spring mounted between said first and second structural parts, a carriage moveably guided by the second structural part, a lever having an end portion attached to said carriage land an opposite end portion connected to the first structural part, and a cable affixed to the carriage which thereby shall be displaced and traction shall be exerted on the cable when the first and second structural parts are moved against biasing action of said spring;

wherein the second support is linked by a linkage to the first support; and the cable is coupled to and acts on the linkage to set the second support into the advanced position when the first and second structural parts are moved against the biasing action of said spring.

4. The headrest as claimed in claim 3, wherein the structural parts are boxy and nest telescopically into each other.

5. The headrest as claimed in claim 3, wherein the first support is approximately U-shaped.

6. The headrest as claimed in claim 3, wherein the second support is a plate.

7. The headrest as claimed in claim 3, further comprising a first cushion pad supported by the first support and a second cushion pad supported by the second support, wherein, when the second support is in the advanced portion, the second cushion pad is not only moved forward of the first cushion pad but also elevated with respect to the first cushion pad.

8. The headrest as claimed in claim 3, wherein the linkage is a parallelogram lever linkage.

9. The headrest as claimed in cairn 8, wherein the cable is coupled to and acts on an arm of the parallelogram linkage.

10. The headrest as claimed in claim 3, wherein said spring biases the first and second structural parts away from each other, and the carriage will be displaced and traction will be exerted on the cable when the first and second structural parts are moved toward each other.

11. The headrest as claimed in claim 10, wherein the structural parts are boxy and nest telescopically into each other.

12. The headrest as claimed in claim 11, further comprising a first cushion pad supported by the first support and a second cushion pad supported by the second support, wherein, when the second support is in the advanced portion, the second cushion pad is not only moved forward of the first cushion pad but also elevated with respect to the first cushion pad.

13. The headrest as claimed in claim 12, wherein the linkage is a parallelogram lever linkage.

14. The headrest as claimed in claim 13, wherein the cable is coupled to and acts on an arm of the parallelogram linkage.

15. A headrest for an automobile seat, said headrest comprising:

a first support;

at least one rod connected to said first support and adapted to support said first support from a backrest of the automobile seat;

a second support displaceable relative to said first support between a retracted position, where the second support is situated at least partly within said first support, and an advanced position, where the second support is moved relative to the first support forward, towards the head of a person seated in the automobile seat;

a lever linkage linking the second support to the first support;

a spring biasing the second support towards the advanced position;

a hook for locking the linkage against biasing action of said spring; and a releasing element for releasing the hook, thereby allowing the second support to move under the biasing action of said spring to the advanced position.

16. The headrest as claimed in claim 15, wherein said hook includes a spring-loaded locking hook that keeps the linkage in a position corresponding to the retracted position of the second support; and said releasing element includes a cable attached to said spring-loaded locking hook for actuating said spring-loaded locking hook.

17. The headrest as claimed in claim 15, further comprising a first cushion pad supported by the first support and a second cushion pad supported by the second support, wherein, when the second support is in the advanced portion, the second cushion pad is not only moved forward of the first cushion pad but also elevated with respect to the first cushion pad.

18. The headrest as claimed in claim 15, wherein the linkage is a parallelogram lever linkage.

19. The headrest as claimed in claim 15, wherein said linkage includes a lever having an end pivotally supported by the first support and an opposite end pivotally attached to the second support by a shaft, said shaft being engaged with and locked by said hook when the second support is in the retracted position.

20. The headrest as claimed in claim 15, wherein the hook is pivotally supported by said first support.

* * * * *

UNITED STATES PATENT AND TRADEMARK OFFICE
CERTIFICATE OF CORRECTION

PATENT NO. : 6,666,516 B2
DATED : December 23, 2003
INVENTOR(S) : Rainer Gramss

It is certified that error appears in the above-identified patent and that said Letters Patent is hereby corrected as shown below:

<u>Title page,</u>
Item [30], Foreign Application Priority Data, should read -- 104 42 625.9 --

Signed and Sealed this

Thirty-first Day of August, 2004

JON W. DUDAS
*Director of the United States Patent and Trademark Office*